United States Patent [19]
Hu

[11] Patent Number: 5,952,997
[45] Date of Patent: Sep. 14, 1999

[54] ENCODER WHEEL ARRANGEMENT

[76] Inventor: Ken-Pei Hu, No. 22, Lane 129, Yun Hsiang Shan Chuang, Sheng Kao Village, Shen Keng shiang, Taipei Hsien, Taiwan

[21] Appl. No.: 09/253,045

[22] Filed: Feb. 19, 1999

[51] Int. Cl.[6] .................................................. G09G 5/08
[52] U.S. Cl. ............................ 345/163; 345/165; 345/166
[58] Field of Search ..................................... 345/163, 164, 345/165, 166, 167, 169; 341/35

[56] References Cited

U.S. PATENT DOCUMENTS

| | | | |
|---|---|---|---|
| 5,168,268 | 12/1992 | Levy | 345/165 |
| 5,252,968 | 10/1993 | Donovan | 345/165 |
| 5,386,460 | 1/1995 | Tseng | 345/166 |

*Primary Examiner*—Vijay Shankar
*Attorney, Agent, or Firm*—Bacon & Thomas

[57] ABSTRACT

An encoder wheel arrangement, which includes a rack mounted on a circuit board, a positioning block supported on spring elements in the rack, an operation wheel supported on the positioning block and turned by hand to rotate a shaft and a notched disk relative to a photoelectric transmitter and a photoelectric receiver on the circuit board, the operation wheel having a plurality of axial grooves equiangularly spaced around its inside wall and turned with the operation wheel to alternatively pass over two opposite ends of the positioning block of the rack for quick positioning at one of a series of angular positions.

4 Claims, 2 Drawing Sheets

ENCODER WHEEL ARRANGEMENT

BACKGROUND OF THE INVENTION

The present invention relates to an encoder wheel designed for use in a remote controller, optical mouse, keyboard, or any other electronic device for scrolling information on a display screen.

A variety of computer input devices including keyboards, mice and trackballs, etc. have been developed. In regular computer mice and trackballs, a ball is rotated to position a cursor on a display screen. However, it is no efficient to scroll information on a display screen by means of a mouse or trackball. When scrolling information on a display screen, the operator may waste a lot of time in moving the mouse on a flat surface or turning the ball of the trackball before reaching the accurate position.

SUMMARY OF THE INVENTION

The present invention has been accomplished to provide an encoder wheel arrangement which eliminates the aforesaid problem. According to one aspect of the present invention, the encoder wheel arrangement comprises a rack mounted on a circuit board, a positioning block supported on spring elements in the rack, an operation wheel supported on the positioning block and turned by hand to rotate a shaft and a notched disk on the shaft, the operation wheel having a plurality of axial grooves equiangularly spaced around its inside wall and turned with the operation wheel to alternatively pass over two opposite ends of the positioning block of the rack for quick positioning at one of a series of angular positions. According to another aspect of the present invention, the circuit board comprises a photoelectric transmitter and a photoelectric receiver disposed at two opposite sides relative to the notched wheel. When the notches disk is rotated with the shaft upon rotary motion of the operation wheel, light from the photoelectric transmitter intermittently passes through the notches at the notched disk to the photoelectric receiver, causing the photoelectric receiver to output an electric signal indicative of the direction and amount of rotary motion of the operation wheel.

DETAILED DESCRIPTION OF THE PREFERRED EMBODIMENT

Figure 1:
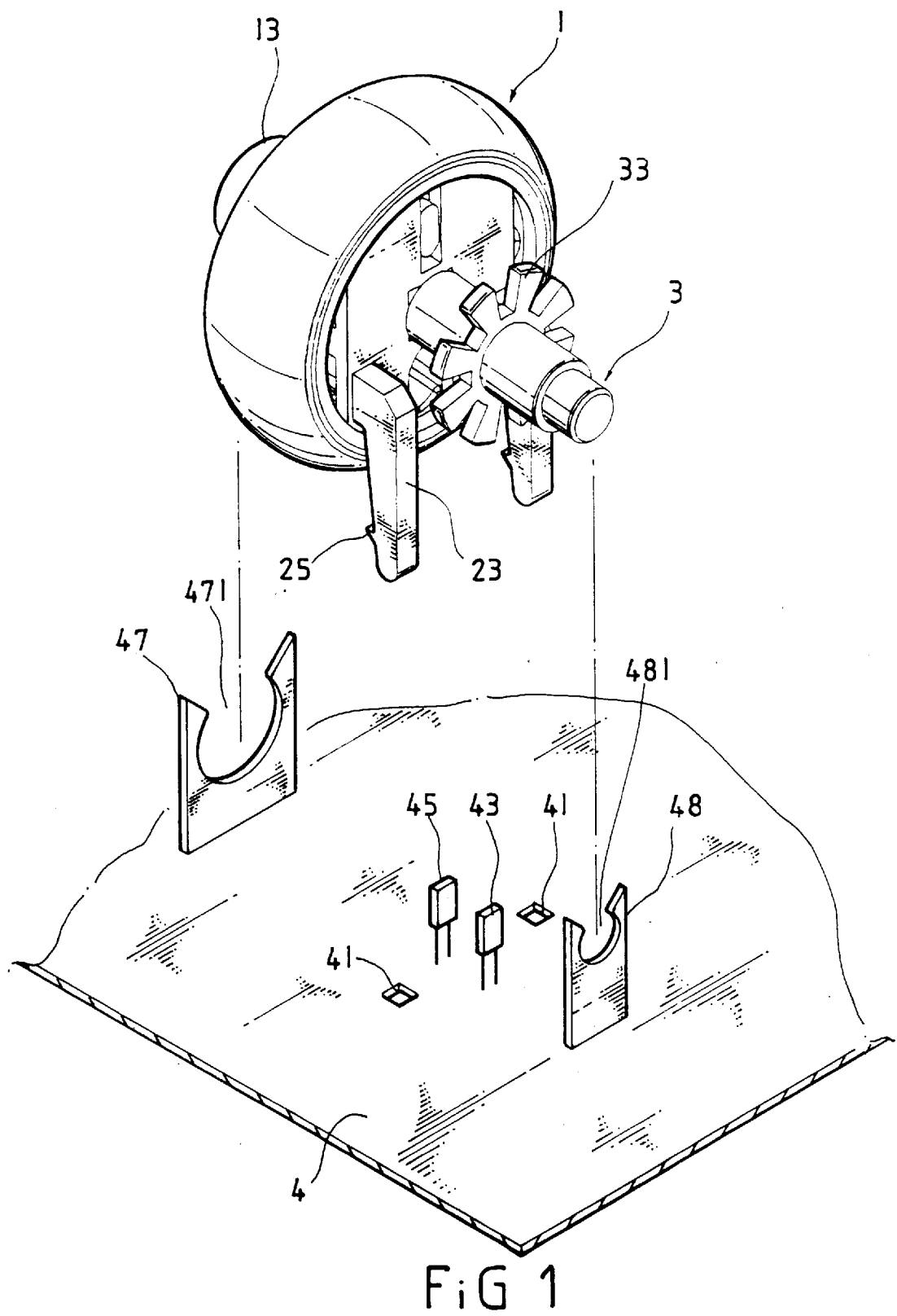
FIG. 1 shows the positioning of an encoder wheel on a circuit board according to the present invention.
Figure 2:
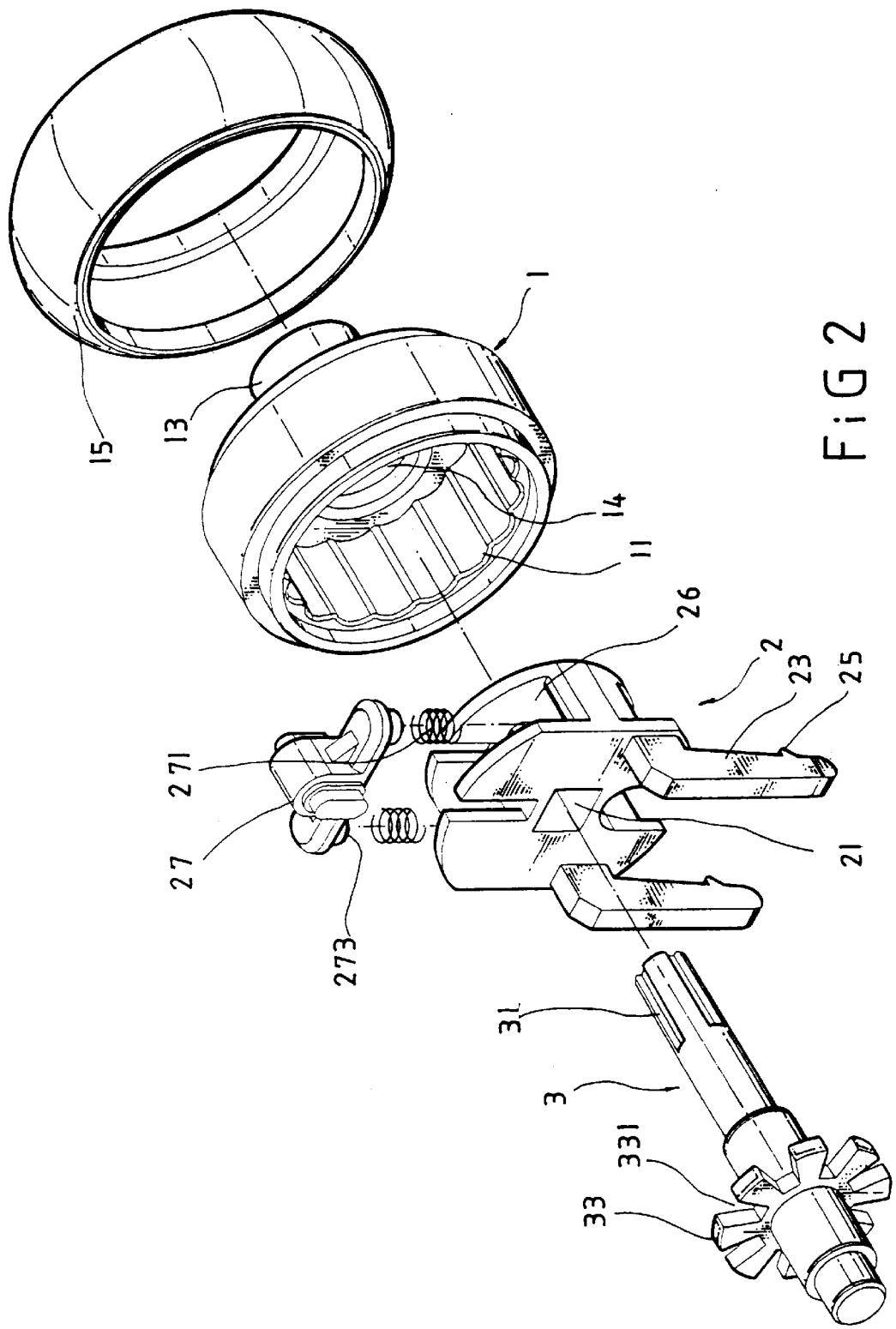
FIG. 2 is an exploded view of the encoder wheel according to the present invention.

Referring to FIGS. 1 and 2, an encoder wheel in accordance with the present invention is designed for use in a remote controller, optical mouse, keyboard, or any other electronic device for scrolling information on a display screen. The encoder wheel comprises an operation wheel 1. The operation wheel 1 is shaped like a cup covered with a rubber covering 15, comprising a plurality of grooves 11 equiangularly spaced around, a knob 13 raised from the center of the outside wall of its one side, and an axial coupling hole 14 defined within the knob 13. The operation wheel 1 is supported on a rack 2 and rotated on it with the hand. The rack 2 comprises an upward open chamber 26, a through hole 21 across the open chamber 26, a plurality of mounting legs 23 for mounting in respective mounting holes 41 at a circuit board 4, a plurality of spring elements 271 mounted in the open chamber 26, and a positioning block 27 supported on the spring elements 271 to contact with the grooves 11 in the operation wheel 1. The mounting legs 23 each have a hooked portion 25. When the mounting legs 23 are inserted into the respective mounting holes 41 at the circuit board 4, the hooked portions 25 of the mounting legs 23 are respectively hooked up with the bottom side wall of the circuit board 4 to secure the rack 2 to the circuit board 4. The positioning block 27 comprises a plurality of bottom rods 273 respectively coupled to the spring elements 271. The spring elements 271 can be for example coiled metal springs. A shaft 3 is inserted through the through hole 21 at the rack 2, having a coupling portion 31 at its one end press-fitted into the coupling hole 14 in the knob 13. A notched disk 33 is securely mounted on one end of the shaft 3 remote from the coupling portion 31. The notched disk 33 has a plurality of peripheral notches 331 equiangularly spaced around the periphery.

Referring to FIG. 1 again, the circuit board 4 comprises a first support 47 and a second support 48 arranged in parallel for supporting the operation wheel 1, a photoelectric transmitter 43 and a photoelectric receiver 45 spaced between the supports 47 and 48. The first support 47 comprises a top coupling hole 471, which receives the knob 13. The second support 48 comprises a top coupling hole 481, which receives the shaft 3.

When the operation wheel 1 is rotated by hand, the grooves 11 are alternatively moved over two opposite ends of the positioning block 27 to achieve scrolling, item selection, zoom in/out, positive/negative reversing, etc. When the notches disk 33 is rotated with the shaft 3, light from the photoelectric transmitter 43 intermittently passes through the notches 331 at the notched disk 33 to the photoelectric receiver 45, causing the photoelectric receiver 45 to output an electric signal indicative of the direction and amount of rotary motion of the operation wheel 1.

While only one embodiment of the present invention has been shown and described, it will be understood that various modifications and changes could be made thereunto without departing from the spirit and scope of the invention disclosed.

What the invention claimed is:

1. An encoder wheel arrangement comprising:
   a circuit board, said circuit board comprising a first upright support and a second upright support arranged in parallel, a plurality of mounting holes, a photoelectric transmitter and a photoelectric receiver spaced between said first upright and said second upright;
   a rack mounted on said circuit board, said rack comprising an upward open chamber, a through hole across said open chamber, a plurality of mounting legs respectively mounting in the mounting holes at said circuit board, a plurality of spring elements respectively mounted in said open chamber, and a positioning block supported on said spring elements;
   a shaft mounted in the through hole at said rack and suspended above said circuit board;
   a notched disk securely mounted on said shaft outside said rack and spaced between said photoelectric transmitter and said photoelectric receiver, said notched disk having a plurality of notches equiangularly spaced around the periphery thereof; and an operation wheel coupled to said shaft and supported on said positioning block of said rack and turned by hand to rotate said shaft, said operation wheel comprising a plurality of axial grooves equiangularly spaced around an inside wall thereof and turned with said operation wheel to alternatively pass over two opposite ends of said positioning block of said rack, and a knob raised from one lateral side thereof.

2. The encoder wheel arrangement of claim 1 wherein said knob of said operation wheel defines a coupling hole, and said shaft comprises a coupling portion at one end thereof inserted into said operation wheel and plugged into the coupling hole in said knob.

3. The encoder wheel arrangement of claim 1 wherein said operation wheel is covered with a rubber covering.

4. The encoder wheel arrangement of claim 1 wherein said spring elements are coiled metal springs.

* * * * *